Figure 1A:
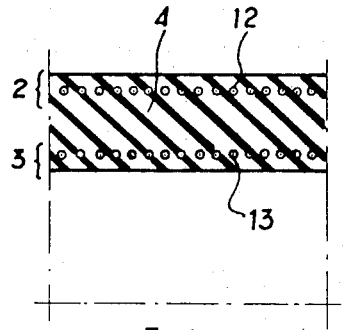

United States Patent [19]
Champleboux et al.

[11] 3,766,949
[45] Oct. 23, 1973

[54] HOSES

[75] Inventors: Jacques Joseph Champleboux; Robert Daniel Delaux, both of Clermont-Ferrand, France

[73] Assignee: Pneumatiques, Caoutchouc Manufacture Et Plastiques Kleber-Colombes, Colombes, France

[22] Filed: Dec. 18, 1970

[21] Appl. No.: 99,628

[30] Foreign Application Priority Data
Dec. 19, 1969  France .................................. 6944301

[52] U.S. Cl. ................................. 138/133, 138/129
[51] Int. Cl. ............................................. F16l 11/08
[58] Field of Search ..................... 138/129, 130, 131, 138/132, 133

[56] References Cited
UNITED STATES PATENTS
| | | | |
|---|---|---|---|
| 2,151,307 | 3/1939 | Smith | 138/130 |
| 2,482,702 | 9/1949 | Billmeyer | 138/130 X |
| 2,090,794 | 8/1937 | Harrah | 138/130 X |

FOREIGN PATENTS OR APPLICATIONS
833,492  7/1938  France .................................. 138/130

Primary Examiner—Herbert F. Ross
Attorney—Holcombe, Wetherill & Brisebois

[57] ABSTRACT

This invention relates to hoses reinforced by metal cables. According to the invention, the reinforcement comprises two or more cables separated by a rubber layer, these cables being helically wound to form, with the axial direction of the hose, an angle equal to or greater than 70°, and preferably equal to or greater than 80°. The layers are crossed and the cables of one layer form, with the hose axial direction, an angle equal to and of sense opposite to that of said axial direction and the cables of said other layer. Supplementary reinforcement may be provided, if required, and comprising an extra thicker metal wire that is helically wound so that its convolutions form an angle not less than 80° with the hose axis or, alternatively, laminated rings located at right angles to the hose axis and constituted by concentric windings of metal strips: such supplementary reinforcement is located in the rubber layer located between the said cable layers.

11 Claims, 14 Drawing Figures

PATENTED OCT 23 1973  3,766,949

SHEET 3 OF 3

HOSES

The present invention relates to hoses and, in order to simplify and clarify the description that is to follow, certain terms and expressions which will be hereinafter used, are defined as follows: the expression "depression" shall mean the difference between the external pressure and the internal pressure; the expression "position angle of an element" shall mean that angle which the element makes with the axial direction of the hose; "crossed layers" shall mean superimposed layers each formed of parallel elements, the position angle of said elements of a layer being equal and of opposite sense to that of the elements of the other layer; the expression "rubber" shall signify any supple and elastic material that is found suitable for the purpose envisaged.

The invention relates to hoses and, more particularly, to suction hoses, that is to say, to hoses which are not easily crushable and are only little deformed when they are utilised in conditions such that the differences between the positive pressure which is exerted on the exterior of the hose and the negative pressure that exists in the interior thereof, attains relatively high values, for example 7 to 8 bars or more. In any case, hoses according to the invention may also work under light delivery, that is to say, under conditions where the internal pressure is higher than the external pressure, the differences between the two pressures being small and, for example, being equal to or less than 2 bars.

In point of fact, it is well-known how to design and manufacture suction hoses intended to be used in the atmosphere, which are submitted to a maximum difference in pressure which, theoretically, may attain 1 bar but which, in fact, is ordinarily only a fraction of 1 bar. On the other hand, several great difficulties are encountered when it is desired to make suction hoses of large diameter intended to be used for example under water and, moreover, at great depths, as in certain dredging operations and which are subjected to great differences in pressure reaching 7 to 8 bars or more; these difficulties are even greater than the hoses must, in general, withstand in all sorts of external conditions.

The invention thus has for an object a hose which has a high resistance to crushing and whose sectional shape geometry is preserved; it also has for an object a hose which not only has the properties previously referred to but which may also be bent about relatively small radii of curvature (for example six times the hose diameter).

Hoses according to the invention are principally characterised in that their reinforcement is constituted by at least two spaced layers separated by an intermediate layer of rubber (hereinafter referred to simply as the intermediate rubber layer), and each formed of metal cables wound into a helix forming, with the axial direction of the hose, an angle equal to or greater than 70°, preferably equal to or greater than 80°, said layers being crossed in such a fashion that the cables of the one layer form, with the axial direction, an angle equal, and of sense opposite to, that formed with said axial direction, by the cables of the other layer.

A layer of metal cables may be adjoined to each of the layers hereinabove referred to so that the reinforcement is thus constituted by two assemblies each formed by two layers and separated by a layer of rubber.

If necessary, in order that the resistance of the hose to crushing may be further increased, complementary stiffening members may be disposed in the intermediate rubber layer, constituted either by a helically wound metal wire or by laminated rings or annuli formed by winding a strip on itself; such hoses possess a high longitudinal rigidity, and preferred circumferential regions may be provided in which, if this shall prove useful, the cylindrical zones, provided with the reinforcement previously referred to, alternate with bellows-forming zones in which the reinforcement is only constituted by two layers or assemblies of layers separated by the intermediate rubber layer.

Hoses have already been made wherein is provided a reinforcement formed by a metal wire wound in a helix and a crossed tissue fabric disposed on either side of this helix. However, such hoses have certain major disadvantages: they are too stiff longitudinally which prevents them taking relatively small radii of curvature, they are very susceptible to accident, and they perish generally by damage to the textile layers.

Suction hoses have also been made which, instead of having a helix of a metal wire, have rigid rings, generally of metal, precision machined to precise specific dimensions for each hose diameter, and which are connected rigidly to the hose so as to avoid crushing. In hoses of this type, the rings, which in practice have no elasticity, not only create zones of high shear, but also, when subjected to high external pressures, become irrevocably crushed, whereby the hose cannot recover its original section. Moreover, these rings, used with fabric layers, inevitably create irregularities in the internal hose wall; these irregularities are the source of disruptions which cause a rapid wear of the hose.

Moreover, these hoses, which must be manufactured with great precision, are extremely expensive; in addition, the fabrication of hoses provided with these rings is long and complicated, since it is necessary to thread the rings without much play over a cylindrical part formed by the finished hose or during manufacture thereof, and the hose must have the same dimensions as the rings.

Moreover, this solution can only be used in hoses which have cylindrical zones and bellows zones, if the said bellows have a diameter less than the diameter of the cylindrical zones on which the rings must be fixed, that is to say, if the undulation of the bellows is on the inside of the hose.

Figure 1B:
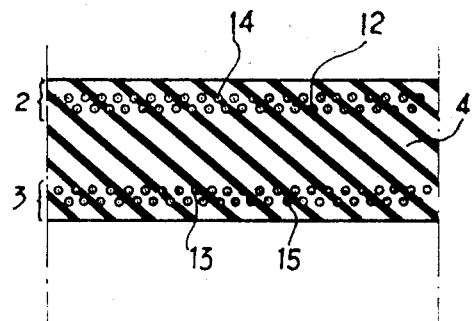
Figure 1C:
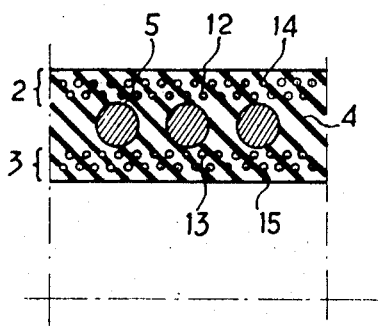
Figure 1D:
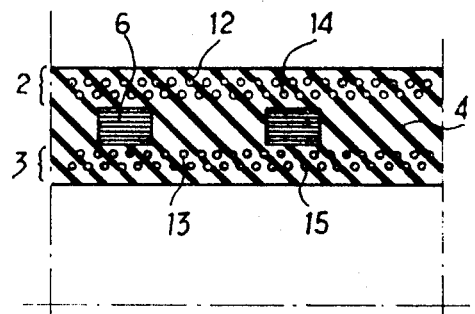
Figure 2:
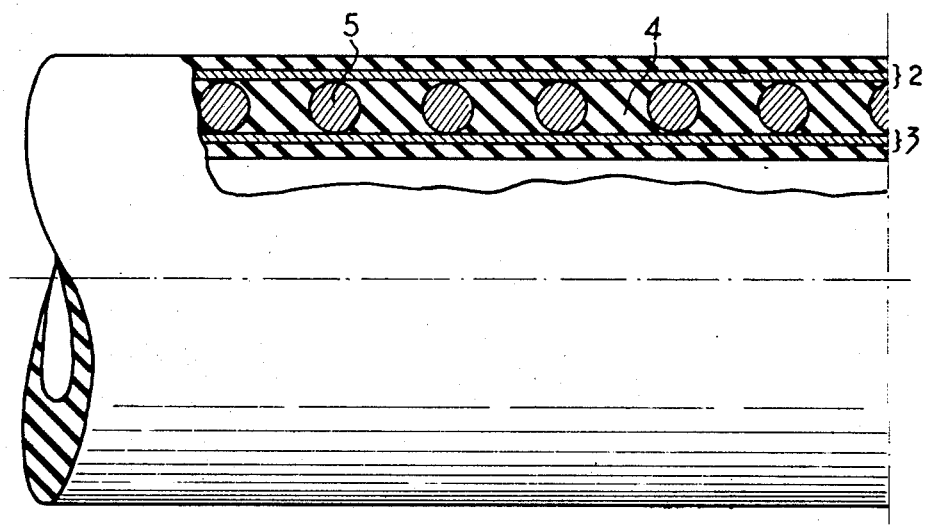
Figure 3:
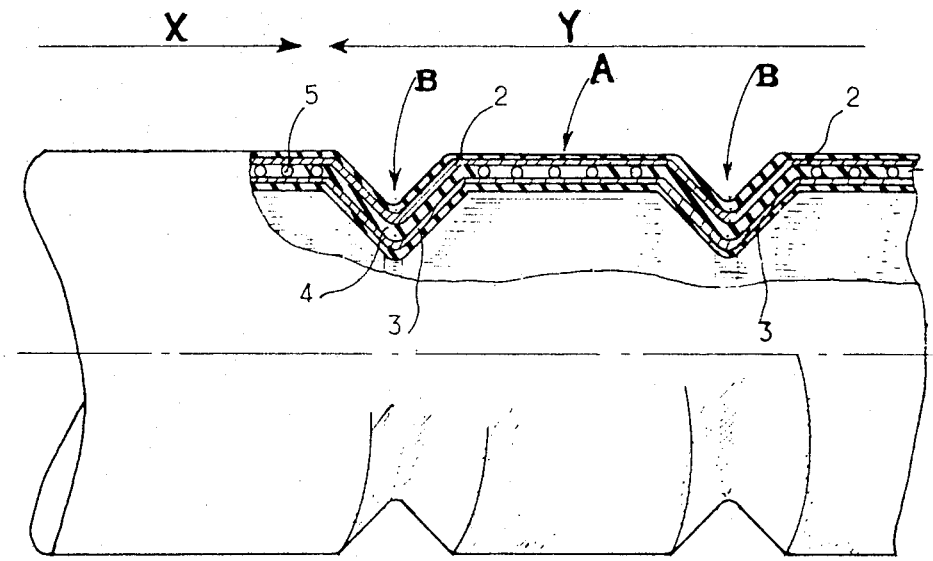
Figure 4:
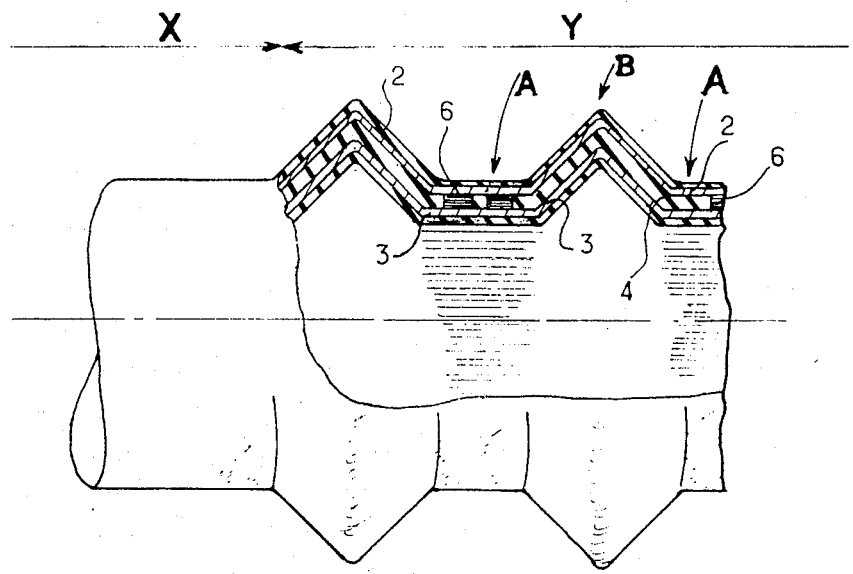
Figure 8:
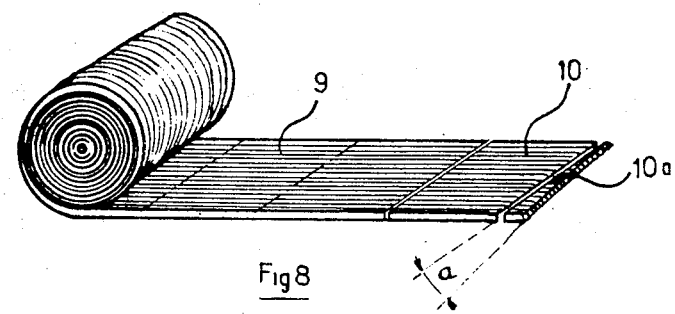
Figure 9:
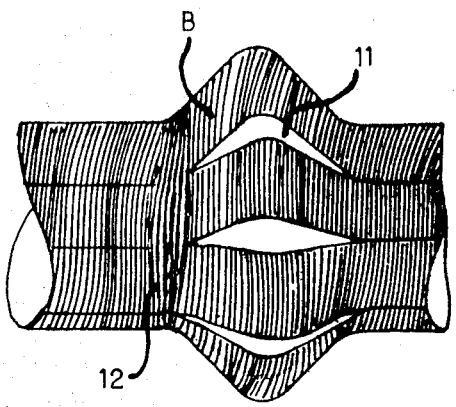
Figure 5:
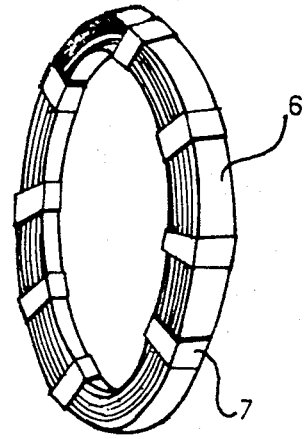
Figure 10:
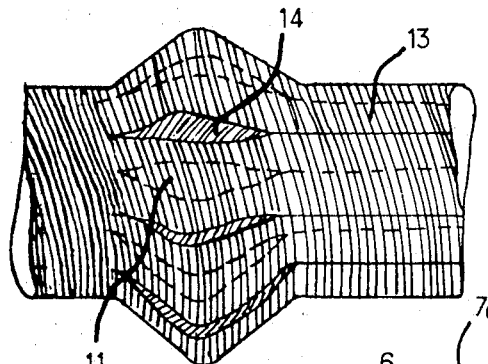
Figure 6:
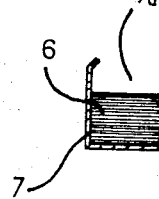
Figure 7:
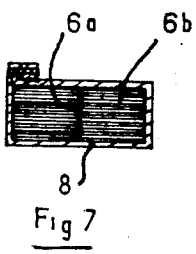

In order that the invention may be more clearly understood, reference will now be made to the accompanying drawings, which show certain embodiments thereof by way of example, and in which:

FIGS. 1a to 1d show sections through the straight wall of hoses according to the invention, FIG. 2 shows an exploded view of a hose according to the invention, FIG. 3 shows cut away view of a hose according to the invention comprising cylindrical parts and a bellow-forming parts, FIG. 4 shows cut away perspective view of a hose according to the invention, FIGS. 5 to 7 show different view of the elements constituting the arrangement of FIG. 4, FIG. 8 shows a layer of cables used for making the hoses of the invention, and FIGS. 9 and 10 show in perspective view the bellows parts of a hose according to the invention and are relative to a particular method of making the said hose.

Referring now to the drawings, the reinforcement of hoses according to the invention comprises two layers 2 and 3 or two assemblies of layers 2 and 3 constituted by metal cables located in proximity to each face of the wall and separated by an intermediate rubber layer.

The reinforcement represented in FIG. 1a, is constituted by two crossed layers 12 and 13 of metal disposed on either side of a layer 4 of rubber, the thickness of which is generally between 0.03 and 0.005 times the internal diameter of the hose. The metal cables of the layers 12 and 13, which are helically wound make with the axis of the hose, an angle equal to or greater than 70° and preferably equal to or greater than 80° (82° in the embodiment); the helix formed by these cables is thus of very short pitch. The hose shown in FIG. 1a does not have a very great diameter, 150 mm, and may work at a depression of 1 bar.

The reinforcement of the hose shown in FIG. 1b differs from that of FIG. 1a in that an additional layer, respectively 14 and 15, is adjoined to each layer of cables 12 and 13. Thus, the reinforcement comprises two assemblies of crossed layers 12-14 and 13-15, located on either side of the rubber layer 4.

In hoses such as those illustrated in certain Figures, in which the reinforcement comprises two double layers, the mutual crossing of the layers may be effected in different ways without this interfering in any appreciable way with the performance of the hose; the cables of the first layer and of the third layer may be in the same direction, whilst the cables of the second and fourth layers may be in the opposite direction, or else the cables of the two first layers may be in the same direction, whilst the cables of the other two layers may be in the opposite direction. Instead of constituting the previously referred to assemblies of two layers, they may be constituted by a larger number of layers.

By forming the reinforcement of the hose of two assemblies of layers, their performance is improved, which allows either hoses of greater diameter to be made, working under identical conditions, or hoses of the same diameter working under more difficult conditions.

The metal cables of the layers or assemblies of layers are of steel, and preferably they only stretch slightly under traction, for example less than 1.2 percent under a load of 150 kg/mm$^2$ of metal, and are only slightly compressible. For example, they may be constituted by helically wound steel wires or strands of wire, one steel wire or steel wire strand additionally acting as a collar or hoop being externally helically wound and of long opposite pitch; these metal cables which not only are of slight stretch-ability but have a high resistance to compression, are well-known *per se*, although they have never been used in this way to form a reinforcement for hoses. In the embodiment, they are formed of three identical strands each comprising six wires disposed around a central wire constituting a core, and a wire wound round the assembly of three strands in a helix of longer and opposite pitch; the wires are of steel and have a diameter of 0.35 mm.

The metal wires are separated, the distances between the two axes of two adjacent cables generally being between 1.1 and 2 times the diameter of the cables. For an easier understanding of the drawings, the layers constituting the assemblies 2 and 3 of the hose according to FIG. 1b and the following Figures are shown separated from one another; in actuality, these layers are generally prepared by causing one layer of parallel cables, formed by means of a frame or creel, to pass through a calender which coats it with rubber, the layer of rubber which separates these layers constituting the assemblies 2 and 3 is that positioned by the calender; the thickness of such a layer is of the order of 0.1 to 0.3 mm.

It has been confirmed that, in a surprising fashion, such a hose has not only a great resistance to crushing and not too high a longitudinal stiffness, but that it has no tendency to break when it is bent.

Apparently, this can be explained by the fact that the position angle of the reinforcing elements being about 90°, this latter behaves a little as though it were formed of transverse annuli, which is the construction that offers the greatest resistance to stresses normal to the wall, such as those set up during depression. This rigidity, which can be referred to as transverse, is additionally increased by the small amount of both the extension or stretch and the compression of the elements of the reinforcement, and also by the girder effect which is due to the fact that the two assemblies 2 and 3 are fairly widely separated.

On the other hand, neither the disposition of the elements of the reinforcement, which are practically transverse, not the separation of the two assemblies 2 and 3, affect the longitudinal flexibility of the hose.

The premises appear to be confirmed by the observation that if the position angle of the reinforcing elements is decreased, these remain identical by their constitution, the resistance to crushing diminishes very quickly with the position angle, whilst the longitudinal rigidity of the hose increases.

If the metal cable layers are replaced by layers formed by a woven fabric textile, which gives a construction similar to those already known, the hose will have a resistance to crushing which is considerably less, a longitucinal rigidity that is considerably increased, and it will be broken if it is bent.

The use of metal cables instead of textile fabric permits obtaining not only a more resistant hose, but moreover a hose whose wall presents a certain elastic recall or memory, which ensures that, if hoses according to the invention are under the effect of an exterior stress, they can assume their original section, which neither hoses reinforced with textile fabric nor those reinforced with metal wires can do.

A hose made with a reinforcement such as that shown in FIG. 1b having a diameter of 300 mm may be subjected to depressions of 2 bars; if it is desired to make hoses having better performance, complementary rigidifying elements are disposed in the intermediate rubber layer 4, said complementary elements being constituted either by a metal wire of fairly large diameter wound in a helix, or by foliated annuli made from a metal strip wound on itself.

In the hoses represented in FIG. 1c, a metal wire 5 generally referred to as a "piano wire" is helically wound at a position angle greater than 85° (87° in the embodiment shown) and is embedded in the rubber layer 4. This metal wire which may, for example, be of circular section, is made from steel of high mechanical resistance, and its diameter which increases with increasing hose diameter, approximates to the thickness of the intermediate rubber layer 4; in the embodiments which are represented in FIGS. 2 and 3, the diameter of this piano wire 5 is 7 mm, the internal diameter of the hose being 700 mm. The metal wire 5 may also, moreover, be of another metal and have another section from that shown, square or X-shaped, for example.

The helically wound wire 5 is a complementary rigidifying element; it improves the performance of the hose considerably, since the hose shown in the embodiment may be subjected without damage to depressions of the order of 10 bars, for example, an immersion in water to a depth of 100 m.

For example, a hose as shown in FIG. 2 has been subjected to crushing stresses such that the diameter has been decreased by 30 percent; such a hose has recovered its original section after the crushing stresses have been removed. By comparison, hitherto available hoses do not regain their original shape even after the application of crushing stresses attaining values of the order of 3 to 5 percent.

Instead of using a helically wound wire as a complementary rigidifying element, there may be employed laminated rings which are of equal interest for the properties which they give to the hose and by the ease with which they may be put into position. This is what is represented in FIG. 1d where the complementary rigidifying elements are laminated rings or circles 6 located at 90° with reference to the axial direction of the hose. Each of these laminated rings is made during manufacture of the hose by winding over the layer or assembly of layers 3, a metal strip of tape having a mechanical elasticity and resistance high enough to obtain a laminated ring having the desired thickness which approximates to that of the intermediate rubber layer 4. This strip is preferably of drawn steel and is previously treated to obtain a maximum adherence of the rubber to the metal. There has been shown in FIG. 5 a perspective view of a laminated ring 6 such as may be made at the time of manufacturing the hose.

For maintaining the concentric windings of each ring or circle 6 in contact, they are held solidly locked by clips 7 which surround the section of the ring. These clips are preferably made from copper-coated steel and their quantity depends upon the diameter of the ring. Thus, for a hose of nominal diameter 200 mm, each laminated ring may have a diameter of 230 mm, and have eight clips equidistantly distributed around its periphery.

Figure 6A:
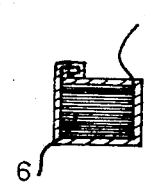

FIG. 6 shows a section through a clip 7 such as is placed on the hose during manufacture, comprising a pocket 7a to receive the strip windings for which it acts as a guiding means so that the latter shall be automatically covered without over-running at the side. When a sufficient amount of strip material has been wound on, the two walls or sides of the clip are bent over and have the appearance shown in FIG. 6a when the action is terminated.

If the ring must have a size such that the winding of the strip proves to be somewhat difficult, two or more rings (6a and 6b in FIG. 7) may be disposed side by side and connected for example by a common clip 8.

The hose shown in FIG. 2 is identical to that of FIG. 1c; thus, it comprises a metal wire 5 wound into a helix which constitutes the complementary stiffening element of the reinforcement.

Depending upon the conditions under which the hose is to be used, the reinforcement will or will not have a complementary rigidifying element. One or more layers of metal cables disposed on each side of the thickness of the rubber 4 will be sufficient if the internal diameter is small, for example equal to or less than 200 mm and if the depression is less than 2 bars; on the other hand, by using a metal wire 5 whose diameter increases as the requirements of the hose are increased, hoses having a diameter of 1,200 mm, operating under depressions of 10 bars and more, can be made. If the requirements are to be even higher, the diameter of the wire 5 would then, however, become such that it would be difficult to wind it under tension.

Moreover, the helix is terminated at its ends in well-known fashion, by making a ring which is closed and welded; this presents no difficulty when the hose is fairly long, but if, as will hereinafter be seen, it is desired to make parts comprising one or two convolutions only, the necessity of making a ring at each end becomes increasingly awkward.

Hoses according to the invention may also make use of complementary rigidifiers such as those shown in FIG. 1d and in FIGS. 4 to 7.

These rigidifying elements are, in this case, laminated rings or circles 6 constituted by a metal strip wound on itself and which may at the same time have any desired thickness and may be as close together as desired. It should be noted that such laminated rings do not produce, in hoses according to the invention, such irregularities as are caused by the rings which are used with a textile reinforcement, because the assemblies of layers of metal cables mitigate against the appearance of such irregularities.

The elastic recall or memory of these rings is greatly superior to that of the machined rings hitherto used and equal to that of helical metal wires; this allows the hoses to be submitted to high depressions without attaining an irreversible oval shape for the hose section.

Hereinabove, it has been indicated that hoses according to the invention have a longitudinal rigidity which is less than that of hoses at present known; this is true and important but nevertheless this rigidity is such that it does not allow the hose to be curved around a small radius, for example, six times the hose diameter.

FIGS. 3 and 4 describe embodiments in which the form of the hose and the reinforcement of certain parts thereof have been modified in such a manner that the hose may be curved around small radii (six times its diameter) without reduction of its useful section.

The hose, instead of being uniformly cylindrical such as is shown in FIG. 2, comprises, for example (FIG. 3), a length X which is uniformly cylindrical, comparable to that of the hose of FIG. 2, and a length Y located in the region where a curve is to be made and composed of cylindrical zones A and bellows-forming zones B. The length Y may also be disposed between two cylindrical lengths X of shorter dimension.

In the lengths X and in the zones A of the lengths Y, the reinforcement is generally constituted like that of the hose shown in FIG. 2, that is to say, by a wire 5 wound to a helical shape in such a fashion that it forms with the axial direction, an angle greater than 80° located between two layers or assemblies of layers 2 and 3 of metal cables whose position angle is greater than 70°; as in all hoses according to the invention, this helix may be replaced by laminated rings 6.

If the lengths Y or the zones A are very short, for example if they correspond to two or three convolutions of the helix, it becomes difficult and quite awkward to dispose a wire in a helical shape, since, as has been explained hereinabove, it is necessary to form a ring at each end of the wire. In the bellows the reinforcement is only constituted by the two layers or assemblies of layers 2 and 3, and the wire 5 or rings 6 are omitted.

The bellows may be located on the inside (FIG. 3) of the hose, or on the outside; generally, and in each case that it is possible, they are located on the outside in order that the useful section of the hose shall not be decreased at this part, which would present various disadvantages.

When the hose curves, the external parts of the curvature stretch easily and the internal parts retract or become compressed easily due to the presence of the bellows of the zones B; a hose having a diameter of 700 mm whose zones A are reinforced as in the hose of FIG. 1c may be curved to radii equal to or even less than 6 times its diameter, without any decrease in its useful section.

Experience has shown that the absence of the wire 5 or the rings 6 in the zones B has no adverse influence on the resistance of the hose to crushing. This can be explained by the fact that one part of the assemblies 2 and 3, separated from one another, present a high transverse rigidity and that, on the other hand, the zones A, which are much more rigid, are integral with the zones B, which prevents them also from becoming crushed.

Hoses according to the invention may be manufactured by process well-known in the rubber industry. For example, a strip of rubber can be wound in a helix whose convolutions touch, on a suitable mandrel so as to form the internal part of the hose (or sheath); in a winding operation, the layer or layers of the assembly 3 are located, the wire 5 is helically wound or metal bands or strips are disposed so as to form the laminated rings 6, the spaces separating the convolutions of the helix formed by the wire 5 or the rings 6 are filled with rubber; the layer or layers of the assembly 2 are located by another winding operation, a further sheet of rubber is wound in a helix with touching convolutions so as to form the external part of the hose (its covering), and then the whole is laced or strapped and vulcanised.

Such a process is well suited to the manufacture of cylindrical hoses having no bellows.

On the other hand, if it is required to make hoses having bellows, the process previously referred to may also be used, but difficulties will be encountered in putting in place the layers 2 and 3 (or the layers of the assemblies 2 and 3) on the undulated parts of the mandrel corresponding to the bellows.

By calendering, there is embedded in the rubber, a layer of metal cables; this layer 9 of longitudinal metal cables (FIG. 8), is cut up transversely into strips 10 at an angle $a$ equal to a right angle less the position angle selected for the cable of the hose. These strips 10 are turned by the angle $a$ and placed end to end; there is thus obtained a strip of parallel cables embedded in rubber, forming with the longitudinal axis of this strip, an angle complementary to the angle $a$, that is to say, an angle equal to the position angle of the cables. Such a method of operation is well-known in the rubber industry and it is therefore not necessary to describe it more fully here.

The continuous strip thus made is cut up into strips of lesser width. These longitudinal strips are located, parallel to one another, on a mandrel of appropriate form covered with a layer of rubber corresponding to the internal part of the hose, so as to cover the whole periphery: due to the fact that these cables, embedded in raw rubber, can become slightly displaced parallel to themselves, the strips will follow, without difficulty, the undulations corresponding to the bellows without altering the angle which the cables themselves form with the axial direction of the hose.

By proceeding in this fashion, the hose is no longer surrounded by continuous cables; it is thus necessary that the longitudinally located strips should be connected together.

In order to effect this, the strips are located so that they partially cover or overlap each other; the extent of the overlap is such that it takes into account the adherence which it is known will obtain between the cables and the rubber, and taking into account also, the qualities or properties of the rubber utilised, the connection between two superimposed strips must be sufficient that the strips do not become separated under the stresses to which the hose will be subjected; the width of this overlap may be, according to requirements, from 1 to 15 cm.

If, as in the example of the hoses shown in FIGS. 1b to 7, assemblies of crossed layers are to be made, the strips are located simply by juxtaposing them, and then, at the time of forming the second layer, strips of the same size are located and staggered, referred to the strips already located, by half their width.

FIGS. 9 and 10 refer to this method of operation. As shown in FIG. 9, the strips 12 forming the lower layer of an assembly of layers, are longitudinally and simple juxtaposed; as a result, at the location of the bellows, where the circumference is greater, there appear openings 11. Then, as is shown in FIG. 10, on the strips 12, there are positioned strips 13 whose cables form with the axial direction, an angle equal to and of sense opposite to, the angle which the cables of the strips 12 make with this same direction; the strips 13 are also juxtaposed, but they are staggered with respect to the strips 12 so that the edges of each strip 13 coincide with the median axes of the two strips 12. At the location of the bellows, openings 14 also appear between the strips 13, but these do not coincide with the openings 11 so that, at all places, there will always be found at least one layer of cables.

Thereafter, a layer of rubber corresponding to the layer 4 is positioned and then, in the same fashion, the upper layer or assembly of layers is formed, and a new layer of rubber corresponding to the external part of the hose (or covering) is positioned, whereafter it is laced or strapped and vulcanised.

If the reinforcement comprises simply two layers separated from each other, the strips are disposed so that they mutually overlap.

If the reinforcement comprises two assemblies of crossed layers, it is generally preferred to operate in the fashion illustrated in FIGS. 9 and 10. Experience has shown that, although there is only one single layer of cables at the locations corresponding to the openings 11 and 14, this does not interfere with the good functioning of the hose; this is probably due to the fact that the surfaces affected by these openings are weak, and that the single layer to be found at these places is firmly connected to the other layer.

Experience has also shown that hoses made by this method in which there are no continuous cables surrounding the whole hose, have properties which are as good as those of hoses made according to conventional methods in which continuous cables surround the hose. Care must always be taken, however, to ensure that the adherence between the cables and rubber in which they are embedded, is excellent.

We claim:

1. A hose for resisting substantially deforming external pressures consisting of a unitary rubbery sheath internally reinforced by metal reinforcement, said reinforcement comprising at least two pairs of helically wound metal cables, one pair disposed within the other pair with the one pair being separated from the other pair by an intervening zone of rubber, said pairs of cables being located in proximity to the respective wall faces of said rubbery sheath, one of each pair of cables being wound in a helix the convolutions of which form with the longitudinal axis of said hose an angle of at least 70° and the second of each pair of cables also being wound in a helix the convolutions of which form with said longitudinal axis an angle of at least 70° but wound in such manner as to form a crossed helix with respect to said first cable of each pair and in spaced proximity to said first cable of each pair.

2. A hose as claimed in claim 1 in which an additional helically wound metal wire the convolutions of which form with the longitudinal axis of said hose an angle of at least 80° is located within said intervening zone of rubber.

3. A hose as claimed in claim 2 in which said additional wire has an external diameter approximately equal to the thickness of said intervening zone of rubber.

4. A hose as claimed in claim 1 in which a plurality of laminated metal rings having their diameters at an angle of 90° with respect to the longitudinal axis of said hose are located within said intervening zone of rubber.

5. A hose as claimed in claim 4 in which said laminated metal rings have an external diameter approximately equal to the thickness of said intervening zone of rubber.

6. A hose as claimed in claim 1 which includes an alternating succession of cylindrical zones and bellows-forming zones, the reinforcement in said cylindrical zones only including an additional helically wound metal wire the convolutions of which form with the longitudinal axis of said hose an angle of at least 80°, said additional wire being located within said intervening zone of rubber.

7. A hose as claimed in claim 6 in which said additional wire has an external diameter approximately equal to the thickness of said intervening layer of rubber.

8. A hose as claimed in claim 1 which includes an alternating succession of cylindrical zones and bellows-forming zones, the reinforcement in said cylindrical zones only including a plurality of laminated metal rings having their diameters at an angle of 90° with respect to the longitudinal axis of said hose, said laminated metal rings being located within said intervening layer of rubber.

9. A hose as claimed in claim 8 in which said laminated metal rings have an external diameter approximately equal to the thickness of said intervening layer of rubber.

10. A hose as claimed in claim 6 in which said bellows-forming portions are of greater diameter than said cylindrical zones of said hose.

11. A hose as claimed in claim 8 in which said bellows-forming portions are of greater diameter than said cylindrical zones of said hose.

* * * * *